US009442935B2

(12) United States Patent
Lehtiniemi et al.

(10) Patent No.: US 9,442,935 B2
(45) Date of Patent: Sep. 13, 2016

(54) METHOD AND APPARATUS FOR PRESENTING MEDIA TO USERS

(71) Applicant: Nokia Corporation, Espoo (FI)

(72) Inventors: Arto Juhani Lehtiniemi, Lempaala (FI); Jussi Artturi Leppanen, Tampere (FI); Antti Johannes Eronen, Tampere (FI)

(73) Assignee: Nokia Technologies Oy, Espoo (FI)

( * ) Notice: Subject to any disclaimer, the term of this patent is extended or adjusted under 35 U.S.C. 154(b) by 333 days.

(21) Appl. No.: 13/907,372

(22) Filed: May 31, 2013

(65) Prior Publication Data

US 2014/0358898 A1     Dec. 4, 2014

(51) Int. Cl.
*G06F 17/30* (2006.01)

(52) U.S. Cl.
CPC ... *G06F 17/30053* (2013.01); *G06F 17/30029* (2013.01)

(58) Field of Classification Search
None
See application file for complete search history.

(56) References Cited

U.S. PATENT DOCUMENTS

| | | | | |
|---|---|---|---|---|
| 8,620,919 B2* | 12/2013 | Gates | ............... | G06F 17/30749 707/737 |
| 8,983,950 B2* | 3/2015 | Askey | ............... | G06F 17/30761 707/734 |
| 2010/0088327 A1* | 4/2010 | Holm | ............... | G06F 17/30053 707/758 |
| 2010/0198944 A1* | 8/2010 | Ho | ........................ | H04L 12/189 709/217 |
| 2011/0131180 A1* | 6/2011 | Tuli | ................... | G06F 17/30053 707/610 |
| 2012/0221687 A1* | 8/2012 | Hunter | ............. | G06F 17/30029 709/219 |
| 2013/0031162 A1* | 1/2013 | Willis | .................... | H04L 67/02 709/203 |
| 2014/0115462 A1* | 4/2014 | Reznor | ............ | H04M 1/72522 715/716 |

* cited by examiner

*Primary Examiner* — Wilson Lee
(74) *Attorney, Agent, or Firm* — Ditthavong & Steiner, P.C.

(57) ABSTRACT

An approach is provided for determining at least two associated users who are presented media items based on respective playlists of media items. The approach further involves analyzing media items in the respective playlists to determine similarity information for the media items in the respective playlists. The approach further involves causing insertion of at least one further media item in the respective playlists of the at least two users at least in part based on the determined similarity information.

21 Claims, 8 Drawing Sheets

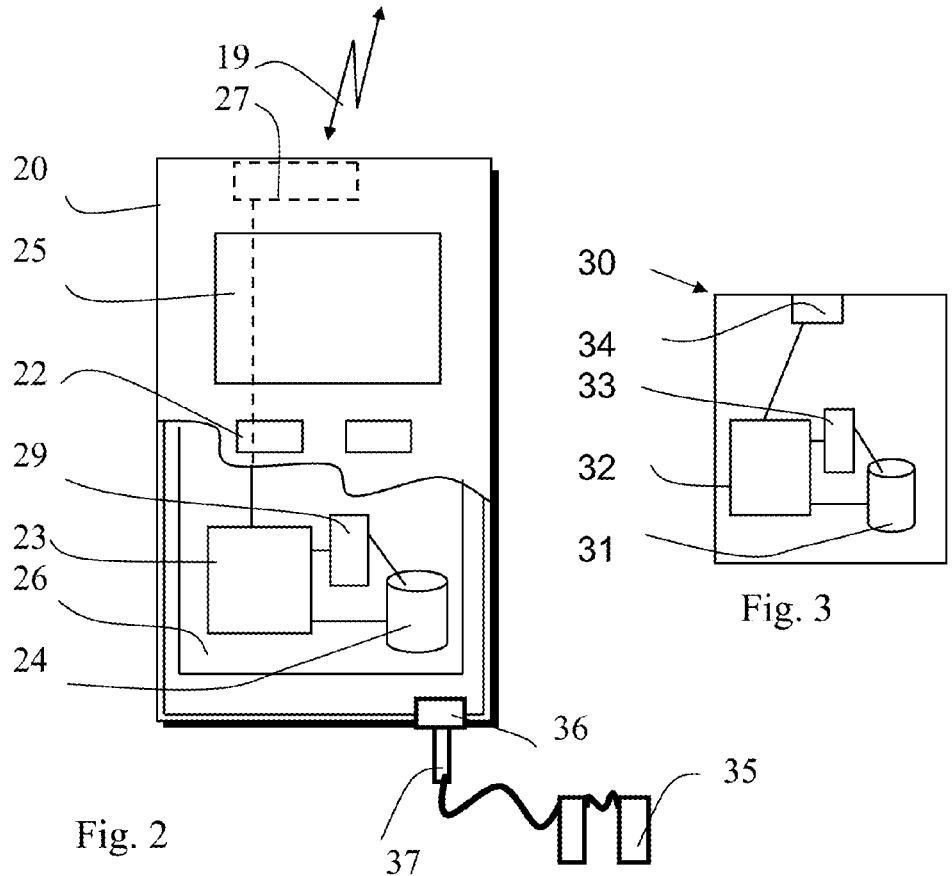
Fig. 2
Fig. 3
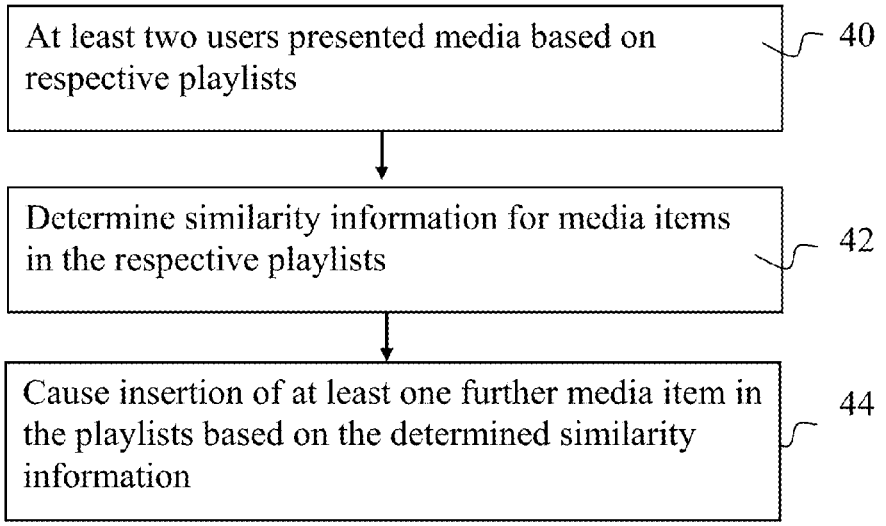
Fig. 4

METHOD AND APPARATUS FOR PRESENTING MEDIA TO USERS

BACKGROUND

This disclosure relates to providing media items, to users based on playlists. More particularly, the disclosure relates to media services, for example music, video and other entertainment services where for example streaming audio, visual, or audio-visual content is provided for users of the services.

Users of communication devices may be provided with various media content services; for example, services delivering music tracks, videos, and so on from an application server. An example of such services is streaming services. Streaming services provide users with streaming multimedia data that is constantly received over a communication network by a terminal device and presented to an end-user while delivered by a service provider. For example, music streaming services may offer users access to music instantly on a terminal device, such as a desktop computer, a laptop computer, or mobile communication device. A client media player at the terminal device can begin playing the data, for example music, film, video clip and so forth, before the entire file has been transmitted. The services facilitate experiencing the media without a need to download the tracks or videos.

Embodiments of the invention aim to provide interaction between the playlists of a plurality of users.

SOME EXAMPLE EMBODIMENTS

Therefore, there is a need for an approach for providing interaction between the playlists of a plurality of users.

In accordance with an embodiment, there is provided a method comprising determining at least two associated users who are presented media items based on respective playlists of media items, analyzing media items in the respective playlists to determine similarity information for the media items in the respective playlists, and causing insertion of at least one further media item in the respective playlists of the at least two users at least in part based on the determined similarity information.

According to another aspect there is provided an apparatus comprising at least one processor, and at least one memory including computer program code, wherein the at least one memory and the computer program code are configured, with the at least one processor, to determine at least two associated users who are presented media items based on respective playlists of media items, analyses media items in the respective playlists to determine similarity information for the media items in the respective playlists, and cause insertion of at least one further media item in the respective playlists of the at least two users at least in part based on the determined similarity information.

According to yet another aspect there is provided an apparatus for a user device comprising at least one processor, and at least one memory including computer program code, wherein the at least one memory and the computer program code are configured, with the at least one processor, to cause presentation of media items by the user device based on a playlist, and handle communication of information by the user device regarding further media items inserted in the playlist based on similarity analysis between playlists of at least two associated users.

In accordance with a more detailed aspect suitable locations in the respective playlists are determined for the insertion of the at least one further media item. The insertion in the respective playlists may be caused such that the at least one further media item is timed to be presented substantially at the same time for the at least two associated users.

In accordance with a more detailed aspect at least one first set of media items in the respective lists is determined, wherein media items in a first set end approximately at the same time. Candidate sets of media items are then determined for individual media items of the first sets, wherein the media items of each candidate set are selected based on similarity with an individual media item of the respective first set. It is then determined whether there is at least one first set of media items where the associated candidate sets contain at least one same further media item and said same further media item is selected for insertion in each playlist. The selected further media item can be inserted in the playlists in location after the media items in the determined first set of media items.

In addition, for various example embodiments of the invention, the following is applicable: a method comprising facilitating a processing of and/or processing (1) data and/or (2) information and/or (3) at least one signal, the (1) data and/or (2) information and/or (3) at least one signal based, at least in part, on (or derived at least in part from) any one or any combination of methods (or processes) disclosed in this application as relevant to any embodiment of the invention.

For various example embodiments of the invention, the following is also applicable: a method comprising facilitating access to at least one interface configured to allow access to at least one service, the at least one service configured to perform any one or any combination of network or service provider methods (or processes) disclosed in this application.

For various example embodiments of the invention, the following is also applicable: a method comprising facilitating creating and/or facilitating modifying (1) at least one device user interface element and/or (2) at least one device user interface functionality, the (1) at least one device user interface element and/or (2) at least one device user interface functionality based, at least in part, on data and/or information resulting from one or any combination of methods or processes disclosed in this application as relevant to any embodiment of the invention, and/or at least one signal resulting from one or any combination of methods (or processes) disclosed in this application as relevant to any embodiment of the invention.

For various example embodiments of the invention, the following is also applicable: a method comprising creating and/or modifying (1) at least one device user interface element and/or (2) at least one device user interface functionality, the (1) at least one device user interface element and/or (2) at least one device user interface functionality based at least in part on data and/or information resulting from one or any combination of methods (or processes) disclosed in this application as relevant to any embodiment of the invention, and/or at least one signal resulting from one or any combination of methods (or processes) disclosed in this application as relevant to any embodiment of the invention.

In various example embodiments, the methods (or processes) can be accomplished on the service provider side or on the mobile device side or in any shared way between service provider and mobile device with actions being performed on both sides.

Still other aspects, features, and advantages of the invention are readily apparent from the following detailed description, simply by illustrating a number of particular embodiments and implementations, including the best mode contemplated for carrying out the invention. The invention is also capable of other and different embodiments, and its several details can be modified in various obvious respects, all without departing from the spirit and scope of the invention. Accordingly, the drawings and description are to be regarded as illustrative in nature, and not as restrictive.

BRIEF DESCRIPTION OF THE DRAWINGS

The embodiments of the invention are illustrated by way of example, and not by way of limitation, in the figures of the accompanying drawings:

FIG. 2 is a diagram of a transceiver apparatus designated schematically, according to one embodiment;

FIG. 3 is a diagram of an example of control apparatus for example to be integrated with, coupled to and/or otherwise arranged for controlling delivery of media content to the communication devices of FIG. 1, according to one embodiment;

FIG. 4 shows an example of a method for inserting a media item playlists of a plurality of users, according to one embodiment;

DESCRIPTION OF SOME EMBODIMENTS

Examples of a method, apparatus, and computer program for providing interaction between the playlists of a plurality of users are disclosed. In the following description, for the purposes of explanation, numerous specific details are set forth in order to provide a thorough understanding of the embodiments of the invention. It is apparent, however, to one skilled in the art that the embodiments of the invention may be practiced without these specific details or with an equivalent arrangement. In other instances, well-known structures and devices are shown in block diagram form in order to avoid unnecessarily obscuring the embodiments of the invention.

Media items may comprise tracks of music, images, video presentation, multimedia presentations, electronic books, electronic cartoons, or electronic articles. The at least one further media item may be presented by a mobile device after the insertion thereof. A user device may be configured to determine information regarding at least one of activity, location, current media item and preferences of the user of the user device. A computer program comprising program code means adapted to perform the herein described methods may also be provided. In accordance with further embodiments apparatus and/or computer program product that can be embodied on a computer readable medium for providing at least one of the above methods is provided. It should be appreciated that any feature of any aspect may be combined with any other feature of any other aspect.

In the following certain exemplifying embodiments are explained with reference to a system that serves wireless or mobile communication devices as well as user devices that are communicating via fixed connections. Therefore, before explaining in detail the exemplifying embodiments, certain general principles of a communication system and access thereto, and communication devices are briefly explained with reference to FIGS. 1 to 3 to assist in understanding the technology underlying the described examples.

Figure 1:
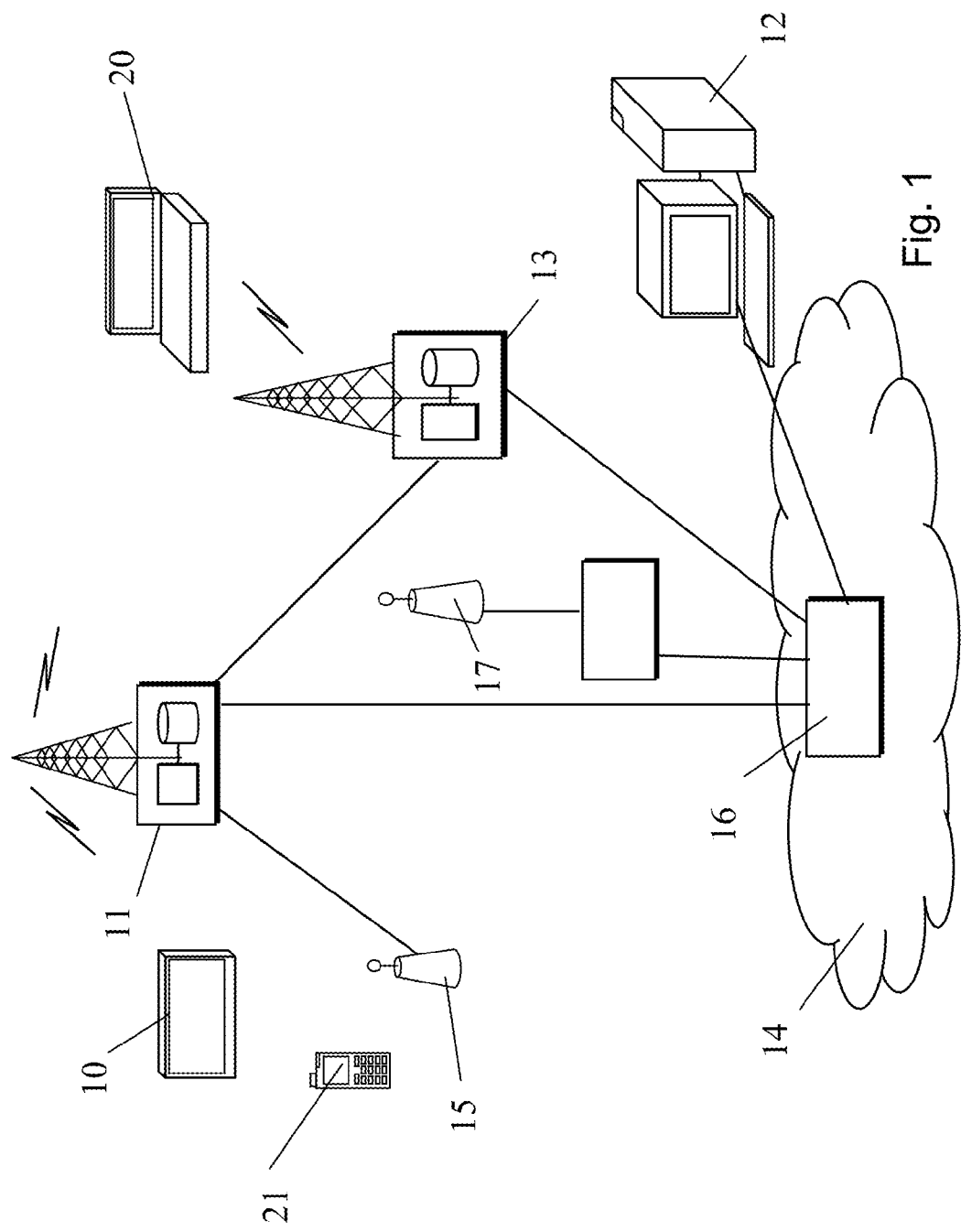
FIG. 1 is a diagram of a system capable of providing interaction between the playlists of a plurality of users, according to one embodiment.

FIG. 1 is a diagram of a system capable of providing interaction between the playlists of a plurality of users, according to one embodiment.

A system 100 of FIG. 1 introduces the capability to providing interaction between the playlists of a plurality of users. A communication system can be seen as a facility that enables communications between two or more nodes such as fixed or mobile communication devices, access points such as base stations, servers and so on. Signals can be carried on wired or wireless carriers. Examples of wireless systems include public land mobile networks (PLMN) such as cellular networks, satellite based communication systems and different wireless local networks, for example wireless local area networks (WLAN). A user can access the communication system by means of an appropriate communication device or terminal. A communication device is provided with an appropriate signal receiving and transmitting arrangement for enabling communications with other parties. Typically a communication device is used for enabling receiving and transmission of communications such as voice, images, video and other data. A communication device of a user is often referred to as a user equipment (UE). Communication devices or terminals can be provided wireless access via base stations or similar wireless transmitter and/or receiver nodes providing radio service areas or cells. In FIG. 1 wireless connectivity is shown being provided by base stations 11, 13, 15 and 17. The wireless communication devices 10, 20 and 21 may comprise any suitable device capable of wireless communication of data. A fixedly connected user terminal 12 is also shown.

The user can be provided with various services via a communication system and terminal devices. Non-limiting examples of the services include two-way or multi-way calls, data communication or multimedia services or simply an access to a data communications network system, such as the Internet. In the herein described scenario current the users are provided with the possibility to experience media content such as music, videos, multimedia and so on based on playlists managed by a controller 16 in a data network system 14. A more particular example of such services is streaming services. In the herein described examples the streaming service enables social interaction between the users. The controller can be provided e.g. by an application server managed by a service provider.

As shown in FIG. 1, the system 100 comprises a user equipment (UE) 10, 12, 20, 21 having connectivity to base stations 11, 13, 15 and/or 17 via a communication network. By way of example, the communication network of system 100 includes one or more networks such as a data network, a wireless network, a telephony network, or any combination thereof. It is contemplated that the data network may be any local area network (LAN), metropolitan area network (MAN), wide area network (WAN), a public data network (e.g., the Internet), short range wireless network, or any other suitable packet-switched network, such as a commercially owned, proprietary packet-switched network, e.g., a proprietary cable or fiber-optic network, and the like, or any combination thereof. In addition, the wireless network may be, for example, a cellular network and may employ various technologies including enhanced data rates for global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., worldwide interoperability for microwave access (WiMAX), Long Term Evolution (LTE) networks, code division multiple access (CDMA), wideband code division multiple access (WCDMA), wireless fidelity (WiFi), wireless LAN (WLAN), Bluetooth®, Internet Protocol (IP) data casting, satellite, mobile ad-hoc network (MANET), and the like, or any combination thereof.

The UE 10, 12, 20, 21 is any type of mobile terminal, fixed terminal, or portable terminal including a mobile handset, station, unit, device, multimedia computer, multimedia tablet, Internet node, communicator, desktop computer, laptop computer, notebook computer, netbook computer, tablet computer, personal communication system (PCS) device, personal navigation device, personal digital assistants (PDAs), audio/video player, digital camera/camcorder, positioning device, television receiver, radio broadcast receiver, electronic book device, game device, or any combination thereof, including the accessories and peripherals of these devices, or any combination thereof. It is also contemplated that the UE 10, 12, 20, 21 can support any type of interface to the user (such as "wearable" circuitry, etc.).

The media is played in order and at the time defined by a playlist. The playlists can be defined on a per user or a group basis, or commonly for all users of the service. A user may influence what goes on his/hers playlist, and/or then select a list from pre-defined playlists.

A message may be communicated to at least one of the users regarding the insertion of the at least one further media item. Communications between devices of the at least two users may be enabled when the at least one item is presented from the respective playlists. The communication may be triggered automatically.

Additional information associated with at least one of the users may be communicated in association with presentation of the at least one further media item, the additional information comprising at least one of location of the user, current activity of the user, audio and/or visual presentation captured by a device of the user, recommendation of another media item relating to the at least one further media item, and posting in a social media network.

At least one transitional media item may be inserted in at least one of the playlists.

The at least one further media item may be selected by an apparatus of a media item delivery system or a social networking system, based on at least media item in at least one playlist and/or based on recommendation by a user.

A user may provide instructions about the timing and/or at least one other user regarding at least one further media item to be inserted.

By way of example, the UE 10, 12, 20, 21, base stations 11, 13, 15 and/or 17 communicate with each other and other components of the communication network using well known, new or still developing protocols. In this context, a protocol includes a set of rules defining how the network nodes within the communication network interact with each other based on information sent over the communication links. The protocols are effective at different layers of operation within each node, from generating and receiving physical signals of various types, to selecting a link for transferring those signals, to the format of information indicated by those signals, to identifying which software application executing on a computer system sends or receives the information. The conceptually different layers of protocols for exchanging information over a network are described in the Open Systems Interconnection (OSI) Reference Model.

Communications between the network nodes are typically effected by exchanging discrete packets of data. Each packet typically comprises (1) header information associated with a particular protocol, and (2) payload information that follows the header information and contains information that may be processed independently of that particular protocol. In some protocols, the packet includes (3) trailer information following the payload and indicating the end of the payload information. The header includes information such as the source of the packet, its destination, the length of the payload, and other properties used by the protocol. Often, the data in the payload for the particular protocol includes a header and payload for a different protocol associated with a different, higher layer of the OSI Reference Model. The header for a particular protocol typically indicates a type for the next protocol contained in its payload. The higher layer protocol is said to be encapsulated in the lower layer protocol. The headers included in a packet traversing multiple heterogeneous networks, such as the Internet, typically include a physical (layer 1) header, a data-link (layer 2) header, an internetwork (layer 3) header and a transport (layer 4) header, and various application (layer 5, layer 6 and layer 7) headers as defined by the OSI Reference Model.

The users may receive data content and communicate with the application server and other users via a variety of different user devices. FIG. 2 shows a schematic, partially sectioned example of a communication device 20 that can be employed in the herein described examples. Such a communication device is often referred to as user equipment (UE) or terminal. An appropriate communication device may be provided by any device capable of sending and receiving signals. Non-limiting examples include a mobile station (MS) such as a mobile phone or what is known as a 'smart phone', a portable computer such as a laptop or a tablet computer provided with a wireless interface card, USB sticks with wireless capabilities or "dongles", or other wireless interface facility, personal data assistant (PDA) provided with wireless communication capabilities, or any combinations of these or the like. A mobile communication device may provide, for example, communication of data for carrying communications such as voice, electronic mail (email), text message, multimedia (images, audio and video), positioning data, other data, and so on. As shown in FIG. 1, a user may also access the system via a fixed line connection e.g. from a desktop computer 12.

A terminal device is typically provided with at least one data processing entity 23, at least one memory 24 and other possible components 29 for use in software and hardware aided execution of tasks it is designed to perform, including control of access to and communications with e.g. application servers and other communication devices. The data processing, storage and other relevant control apparatus can be provided on an appropriate circuit board and/or in chipsets. This feature is denoted by reference 26. The user may control the operation of the mobile device by means of a suitable user interface such as key pad 22, voice commands, touch sensitive screen or pad, combinations thereof or the like. A display 25, a speaker and a microphone are also typically provided. A still and/or video camera may also be provided. Furthermore, a communication device may comprise appropriate connectors (either wired or wireless) 36 other devices and/or for connecting external accessories, for example headsets, hands-free equipment and so on, thereto. FIG. 2 shows a pair of earpieces 35 connected to device 20 via a connector plug 37 and a socket 36.

FIG. 2 is a diagram of a transceiver apparatus designated schematically, according to one embodiment. The mobile device may receive and transmit dedicated signals 19 by the stations of FIG. 1 via appropriate apparatus for receiving and transmitting signals. FIG. 2 transceiver apparatus is designated schematically by block 27. The transceiver may be provided for example by means of a radio part and associated antenna arrangement. The antenna arrangement may be arranged internally or externally to the mobile device. A wireless communication device can be provided with a Multiple Input/Multiple Output (MIMO) antenna system.

FIG. 3 is a diagram of an example of a control apparatus 30, for example to be integrated with, coupled to and/or otherwise arranged for controlling delivery of media content to the communication devices of FIG. 1. The control apparatus 30 can be arranged to provide control on playlists and the herein described examples of analysis and determining functions to insert new items in the playlists. For this purpose the control apparatus comprises at least one memory 31, at least one data processing unit 32, 33 and an input/output interface 34. Via the interface the control apparatus can be coupled to the data network for communications. The control apparatus can be configured to execute an appropriate software code to provide the functions.

The following describes examples of richer interaction between the user of content delivery services such as streaming services to provide new and enhanced experiences. In accordance with an example there is provided a social music system that automatically and intelligently inserts songs, instrumentals or other pieces of music, termed in the following as tracks, into a plurality of playlists of people who are associated with a user. This can be provided e.g. via association in a social network the user is a member of.

FIG. 4 shows an example of a method for inserting a media item playlists of a plurality of users, according to one embodiment. It is determined at 40 that at least two associated users are presented media items based on respective playlists of media items. Media items in the respective playlists are analyzed at 42 to determine similarity information for the media items in the respective playlists. At least one further media item is then inserted at 44 in the respective playlists of media items of the at least two users at least in part based on the determined similarity information.

The insertion can be caused such that the inserted one or more media items, for example tracks of music can be played at the same time for all members of a group of associated users. This can be provided to form a social connection between the users.

The system applies track level similarity data to determine a suitable position for the insertion and thus intersection in experiencing the content by the users. This provides continuity of e.g. a music playlist for at least two users.

Figure 5:
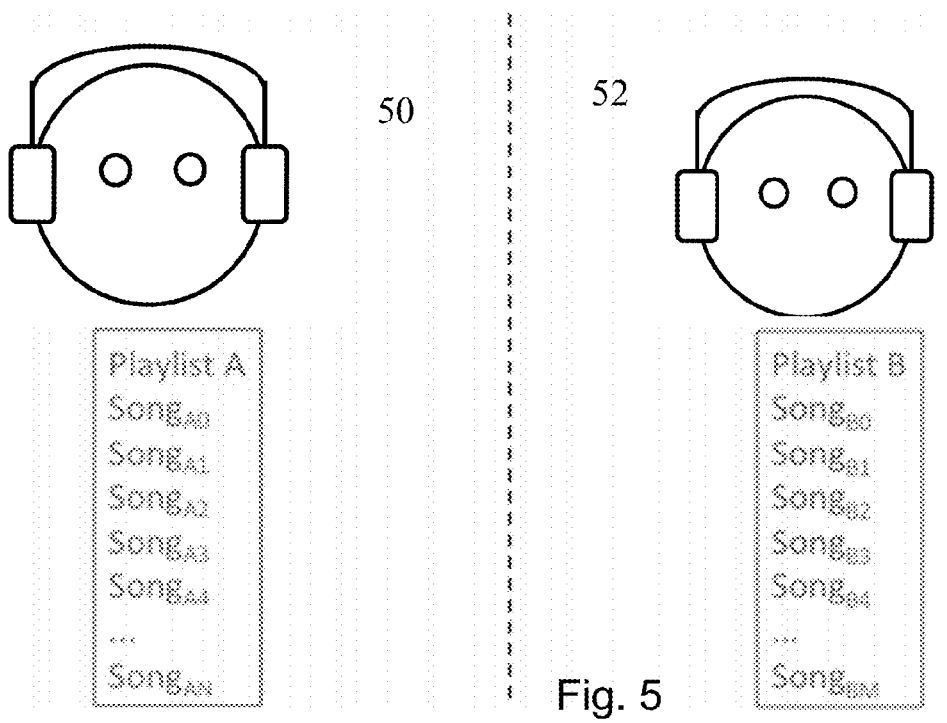
FIG. 5 illustrates a specific example relating to recommendations of music and social music experiences, according to one embodiment.

FIG. 5 illustrates a specific example relating to recommendations of music and social music experiences, according to one embodiment. In FIG. 5 users 50 and 52 are listening to their playlists A and B, respectively. Users 50 and 52 are not in direct contact with each other but can be associated as 'friends' in for example a music streaming service or a social network. It is noted that although only two associated users are shown in the example for simplicity, there can be more than two such users. Also, the users do not necessarily need to be friends but could be any two users of the service. In this case, connections can be created e.g. between previously unknown users of the service based on the similarity of their listening habits. The association between users is created based on the similarity in their current playlists, for example two or more users are listening to playlists which share some similar tracks or there is an intersection in the similar track lists for the playlist items. Alternatively, or in addition, the association can be created based on similarity of overall listening profiles for example between users who listen to similar artists or share some common artists, tracks and/or albums in their listening or media consumption profiles.

A control apparatus of a streaming service determines that the two associated users are listening to music at the same time from playlists A and B. It is then determined if there is at least one track that could be inserted on playlists A and B that matches the music listening tastes of users 50 and 52. If so, such a common track is inserted in playlists A and B.

Figure 6:
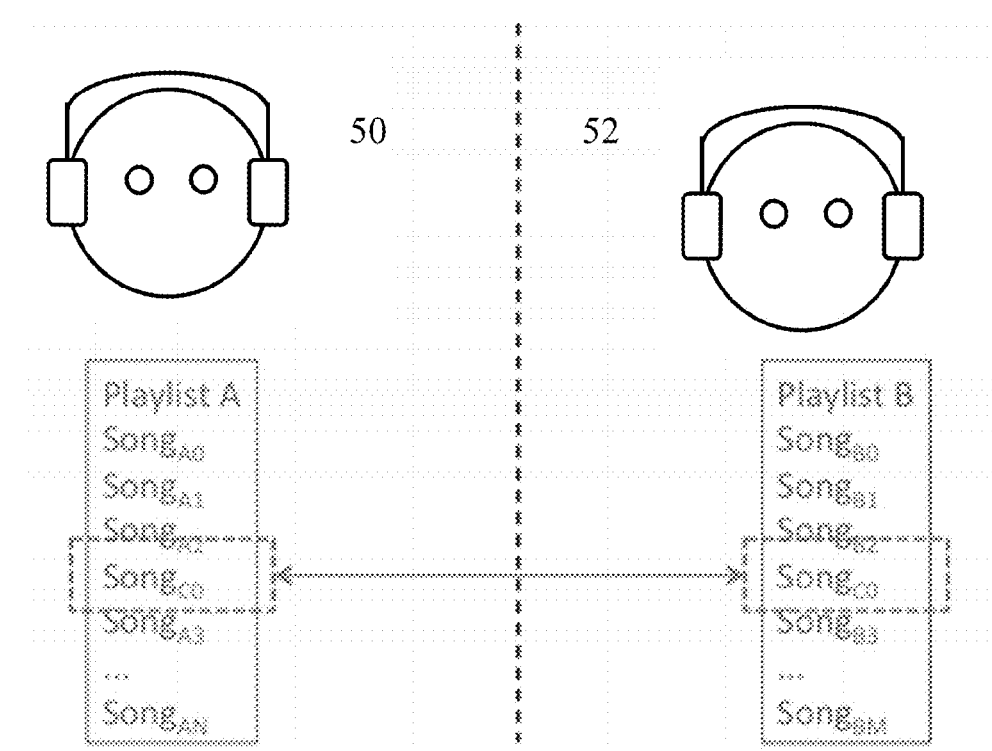
FIG. 6 illustrates one common track being inserted in playlists, according to one embodiment.

FIG. 6 illustrates one common track (SongC0) being inserted in playlists A and B, according to one embodiment. The track can be inserted such that it will play at substantially the same time for users A and B. As shown, the inserted track is timed to be consumed substantially at the same time as a track that maps to music listening preferences of users 50 and 52.

In accordance with an example selecting a track which matches the playlists of all associated users can be done by a procedure where the currently selected future tracks in both playlists A and B are analyzed first. Pairs of music tracks are selected from playlist A and playlist B such that the tracks in pairs will end approximately at the same time. A certain tolerance can be allowed in here, for example the pairs consist of tracks ending within 30 seconds or other predefined period from each other. For the tracks in a pair playing approximately at the same time, a set of N similar tracks is determined. This can be done for both tracks in the pair separately. An appropriate method of for example content-based similarity, collaborative filtering, or social tag based similarity metrics can be used for the selection of similar tracks. For example, a content-based music similarity algorithm can be used to analyses the spectral, rhythmic, and harmonic content of the track and produce a measure of similarity. For example, a similarity value from a range 0 to 1 for each pair of tracks can be determined.

The number N of most similar tracks can at this stage be a substantially large, for example, one hundred tracks can be determined.

An intersection of the similar track sets is then determined for the current track pair. If the intersection is empty, a next track pair is selected. Otherwise, at least one track from the intersection is inserted in the lists to follow the pair of tracks in both playlists. In the example of FIG. 6 this is SongC0 which will now be played to both users approximately at the same time.

Figure 7:
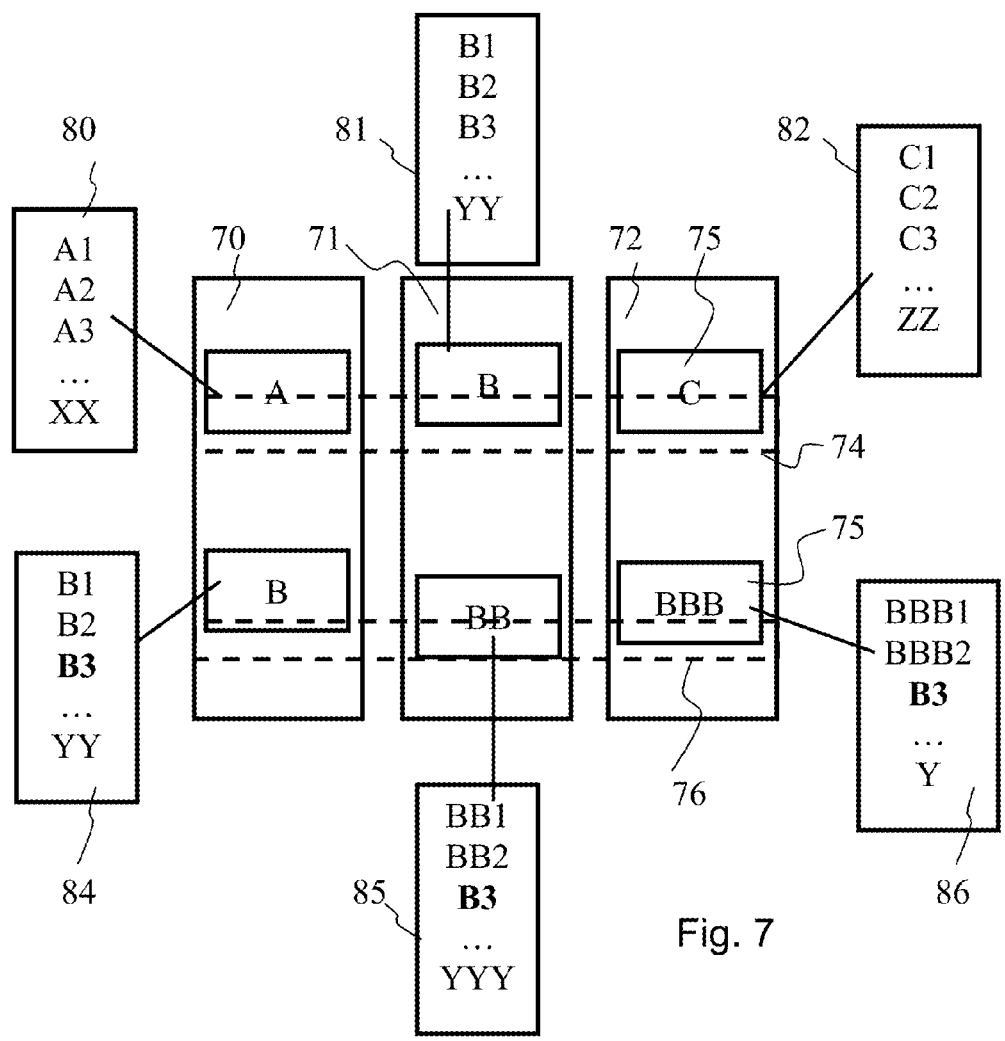
FIG. 7-8 is a schematic block diagram and flowchart illustrating a selection procedure by way of an example with three playlists of media items for associated users, according to one embodiment.
Figure 8:
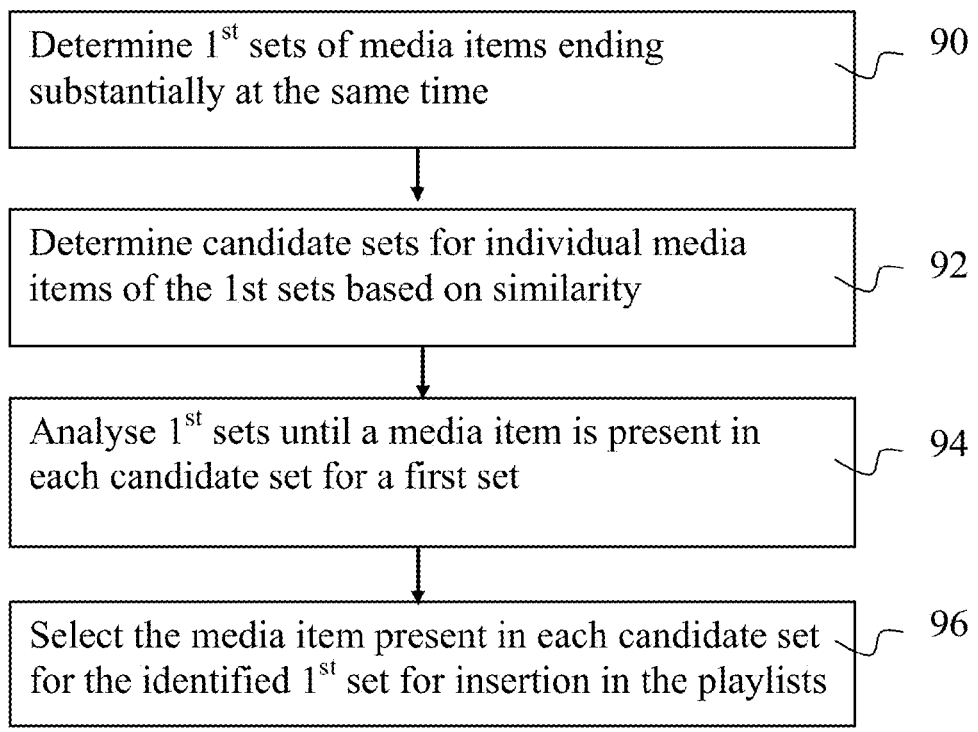

FIG. 7-8 is a schematic block diagram and flowchart illustrating a selection procedure by way of an example with three playlists of media items for associated users, according to one embodiment. Although the example of FIG. 7 shows only two items 75 per each list for simplicity it shall be understood that each list can comprise a substantial large number of items. A control apparatus is configured to determine at step 90 first sets of media items in the respective lists, the each first set being defined as a set of media items 75 that end approximately at the same time. That is, items A, B and C end within period 74 denoted by a dashed line and items B, BB and BBB end within period 76. The control apparatus then determines at 92 candidate sets 80, 81, 82, 84, 85 and 86 of media items for each member A, B, C, BB and BBB of the first sets by a procedure where the members of each candidate set are selected based on their similarity with a member of the respective first set. The control apparatus then determines at 94 a first set of media items where the associated candidate sets contain at least one same further media item. As is shown, the first set consisting of media items A, B and C each ending within period 74 does not have any common items in the candidate sets 80 to 82 and therefore the process progresses to the next set consisting of items B, BB, and BBB ending within period 76. As item B3 appears on each candidate set 84 to 86, this item is selected at 96 for insertion in each playlist 70, 71 and 72. According to a possibility the selected item can be inserted directly after items B, BB and BBB in playlists 70, 71, and 72.

When the track plays there can be interaction between the users 50 and 52. According to a possibility a notification of the common listening experience is displayed for both users by their respective devices. For example a simple non-intrusive notification or context dependent notification e.g. "You and John are now experiencing the same track together" or "John rocks the same track now in New York while having lunch" can be displayed. The message and amount of information distributed can depend on the privacy settings in the application. Activity of a user may also be detected, e.g. using an activity detection algorithm, and information thereof can be included in the notification. For example, notification "John is jogging while listening to this track" can be displayed. An activity recognition algorithm can be based on any appropriate method for user activity detection on mobile devices or other terminal devices. Such methods can for example apply analysis methods on sensor and other signal data on the device to determine what the user of the terminal is doing. An example includes an algorithm which processes the device accelerometer signal data to determine whether the user is running, walking, or being still.

A picture or a video clip can be captured with a camera of the device and shared with the associated user(s) for example to indicate a user's mood or context. This can be an automatic or semi-automatic function of the user device. In the latter option the user can confirm whether he/she wishes to share the picture or video clip.

Recommendations from playlist(s) of other user(s) can also be provided. The recommended tracks can relate to the common track, e.g. be tracks around a common track or e.g. tracks from the same performer, act or of the same genre. In another example, a recommendation algorithm is used to provide more tracks which are similar to the common track, and a suggestion is made to the users whether they wish to listen to the recommended tracks instead, or continue on the previous playlist.

Instant message communication may be automatically enabled between the users to allow communication that is related to the track. A common social media posting e.g. "Andy and John experienced 'Song Z' by Band 1 together while jogging and playing basketball" may be provided.

Figure 9:
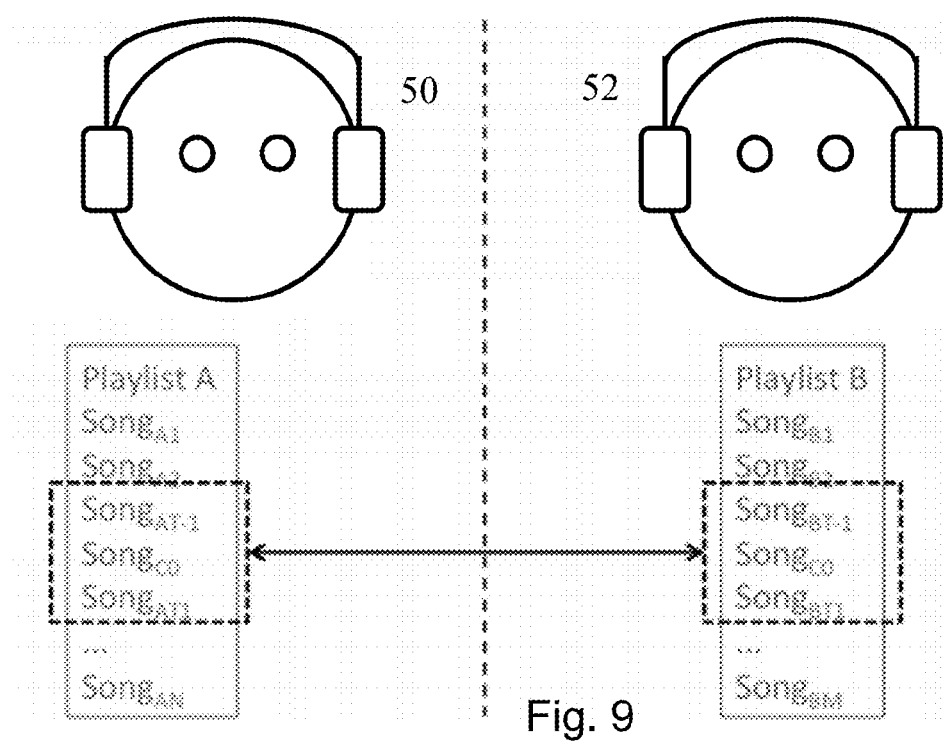
FIG. 9 shows a further example as to how transitional tracks can be added to the playlist, according to one embodiment.

FIG. 9 shows a further example as to how transitional tracks can be added to the playlist, according to one embodiment. This is illustrated in FIG. 9 showing generation of transitional tracks to make to a track to be inserted (SongC0) suit better the target playlists and/or for enabling the playback of the track 'SongC0' at a given moment. If an inserted track, or 'SongC0' in the example, differs considerably from other tracks on the playlists A and/or B, intermediate transitional tracks (SongAT-1, SongAT1, SongBT-1, SongBT1) are inserted in the playlists so that the inserted track suits better both modified playlists of FIG. 9.

The detection of when a track considerably differs from other tracks on the playlist can be done, for example, by comparing the similarity value between the track to be inserted and the track immediately preceding the track to be inserted. If the similarity value is smaller than a predetermined threshold, the system may determine that one or more transitional songs are required so as to make the transition "smoother". Thus the system can be arranged to control that the tracks following each other in the playlist bear a good degree of similarity to each other.

Transitional tracks can be picked by means of a recommendation algorithm. For example, any appropriate method which can produce similarities between tracks can be used for this purpose. Content based methods are considered to be particularly well suited for this purpose since they ensure that the actual tracks are similar. Other methods, such as those that can operate on the artist level and/or do not consider track level data, may also be used.

In accordance with an example one of the users can choose a track for insertion instead of or in addition to system generated automatic recommendations. In this case the user indicates for the system that he/she wants one or more friends to listen a selected track with him/her. The associated playlist(s) can then be modified as in the example above by adding the track thereto such that it fits substantially seamlessly into the multiple lists. The system can select a suitable location for the track in the list so that a meaningful playlist is produced for the other user as well. The track is played at the same time for the requesting user and the target user(s). In accordance with an example a track to be inserted in playlists may originate from service editors. It may be, for example, a track of the week being promoted by the service or by a third party.

Appropriate algorithms for track recommendation can be used to determine a track that is added to the users' playlists using e.g. the users' listening history, their current playlists and any other information of their preferences as a basis.

The above described system can be implemented as a part of a streaming music or other media service with social features. A music streaming service can be used to provide the required components to provide the music service whereas the above selection and insertion can be added thereto. The system can also be implemented as a part of a social networking system or the like. Additional software and/or hardware modules related e.g. to connection and access to a social network site, for the dynamic creation of new playlist items and timing them in the music stream so that connections occur and for providing a messaging or other interaction functionality for users to interact when they are listening to the same track can be provided.

The above described music relates example provided a way of providing music recommendations and listening experiences in a socially connecting manner. Seamless insertion of new tracks in playlists may be provided. Different sensor and context data and communications can be combined to the music listening experience. Recommendations may be provided simultaneously with listening. Different types of interaction are allowed. The scheme allows for suitable recommendations to multiple playlists at a given time. Additional transitional tracks or recommendations may be provided to enable listening a selected track at a given time such that is seamlessly fits is other tracks on a playlist. A surprise effect may be provided by discovery of new music simultaneously by associated users.

According to yet another example appropriate apparatus or means are provided for inserting media items in playlists of associated users. Such apparatus can comprise means for determining at least two associated users who are presented media items based on respective playlists of media items, means for analyzing media items in the respective playlists to determine similarity information for the media items in the respective playlists, and means for causing insertion of at least one further media item in the respective playlists of the at least two users at least in part based on the determined similarity information. Means may also be provided for determining suitable locations in the respective playlists for the insertion of the at least one further media item and/or for causing the insertion in the respective playlists such that the at least one further media item is timed to be presented substantially at the same time for the at least two associated users.

In accordance with an example means for determining at least one first set of media items in the respective lists is provided, wherein a first set is determined such that presentation of media items in the given first set end approximately at the same time. The means can then determine candidate sets of media items for individual media items of the first sets, wherein the media items of each candidate set are selected based on similarity with an individual media item of the respective first set and determine whether there is at least one first set of media items where the associated candidate sets contain at least one same further media item. The means for insertion can then insert the selected further media item in the playlists in location after the media items in the determined first set of media items.

Means for causing messaging to at least one of the users regarding the insertion of the at least one further media item may also be provided. The means may be arranged to enable communications between devices of the at least two users when the at least one item is presented from the respective playlists. The communication may comprise communication of additional information associated with at least one of the users in association with presentation of the at least one further media item, the additional information comprising at least one of location of the user, current activity of the user, audio and/or visual presentation captured by a device of the user, recommendation of another media item relating to the at least one further media item, and posting in a social media network.

The means can be configured for determining and inserting at least one transitional media item in at least one of the playlists.

A user device can be provided with means for presenting the at least one further media item after the insertion thereof based on similarity analysis between playlists of at least two associated users in the respective playlist. The means can handle communication of information by the user device regarding the further media items inserted in the playlist. Means for determining information regarding at least one of activity, location, current media item and preferences of the user of the user device may also be provided.

The herein described embodiments may be beneficial in providing beam steering and/or stabilization based on utilization of existing capabilities of mobile devices.

It is noted that whilst embodiments have been described using a mobile communication system and desktop computer as an example, similar principles can be applied to any other system where content can be provide for users based on playlists. For example, instead of communications between a user terminal and an application server in a data system communications may be provided between two mobile devices or other user devices. For example, the principles can be applied where a user device manages the insertion of new media items into playlist of a group of users. Therefore, although certain embodiments were described above by way of example with reference to certain exemplifying architectures for networks and technologies, embodiments may be applied to any other suitable forms of communication systems than those illustrated and described herein.

It is also noted that while the above has been described using music tracks as an example, similar principles are applicable to other media types as well. Examples of these include but are not limited to electronic books, movies, video clips, cartoons, images, news articles, and so on.

In various example embodiments the methods (or processes) can be accomplished on a service provider side or on a mobile device side or in any shared way between service provider and mobile device with actions being performed on both sides.

The required data processing apparatus and functions at the relevant devices may be provided by means of one or more data processors. The described functions may be provided by separate processors or by an integrated processor. The data processing apparatus may be of any type suitable to the local technical environment, and may include one or more of general purpose computers, special purpose computers, microprocessors, digital signal processors (DSPs), application specific integrated circuits (ASIC), gate level circuits and processors based on dual-core or multi-core processor architecture, as non-limiting examples. The data processing may be distributed across several data processing modules. A data processor may be provided by means of, for example, at least one chip. Appropriate memory capacity can also be provided in the relevant devices. The memory or memories may be of any type suitable to the local technical environment and may be implemented using any suitable data storage technology, such as semiconductor based memory devices, magnetic memory devices and systems, optical memory devices and systems, fixed memory and removable memory, including appropriate types of random access memory (RAM) and read-only memory (ROM).

In general, the various embodiments may be implemented in hardware or special purpose circuits, software, logic or any combination thereof. Some aspects of the invention may be implemented in hardware, while other aspects may be implemented in firmware or software which may be executed by a controller, microprocessor or other computing device, although the invention is not limited thereto. While various aspects of the invention may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, for example for controlling communications, user interface, and data processing, general purpose hardware or controller or other computing devices, or some combination thereof. The software may be stored on such physical media as memory chips, or memory blocks implemented within the processor, magnetic media such as hard disk or floppy disks, and optical media such as for example DVD and the data variants thereof, CD, and a cloud storage arrangement.

The foregoing description has provided by way of exemplary and non-limiting examples a full and informative description of the exemplary embodiment of this invention. However, various modifications and adaptations may become apparent to those skilled in the relevant arts in view of the foregoing description, when read in conjunction with the accompanying drawings and the appended claims. However, all such and similar modifications of the teachings of this invention will still fall within the spirit and scope of this invention as defined in the appended claims. Indeed there is a further embodiment comprising a combination of one or more of any of the other embodiments previously discussed.

The processes described herein for providing interaction between the playlists of a plurality of users may be advantageously implemented via software, hardware, firmware or a combination of software and/or firmware and/or hardware. For example, the processes described herein, may be advantageously implemented via processor(s), Digital Signal Processing (DSP) chip, an Application Specific Integrated Circuit (ASIC), Field Programmable Gate Arrays (FPGAs), etc. Such exemplary hardware for performing the described functions is detailed below.

Figure 10:
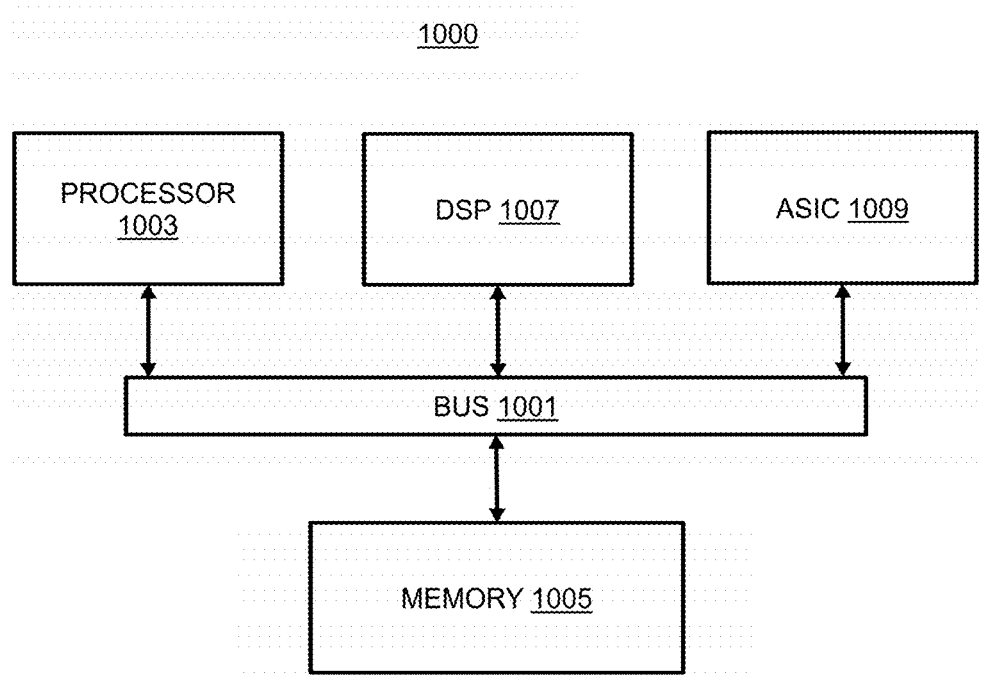
FIG. 10 illustrates a computer system 1000 upon which an embodiment of the invention may be implemented.

FIG. 10 illustrates a computer system 1000 upon which an embodiment of the invention may be implemented. Although computer system 1000 is depicted with respect to a particular device or equipment, it is contemplated that other devices or equipment (e.g., network elements, servers, etc.) within FIG. 10 can deploy the illustrated hardware and components of system 1000. Computer system 1000 is programmed (e.g., via computer program code or instructions) to providing interaction between the playlists of a plurality of users as described herein and includes a communication mechanism such as a bus 1010 for passing information between other internal and external components of the computer system 1000. Information (also called data) is represented as a physical expression of a measurable phenomenon, typically electric voltages, but including, in other embodiments, such phenomena as magnetic, electromagnetic, pressure, chemical, biological, molecular, atomic, sub-atomic and quantum interactions. For example, north and south magnetic fields, or a zero and non-zero electric voltage, represent two states (0, 1) of a binary digit (bit). Other phenomena can represent digits of a higher base. A superposition of multiple simultaneous quantum states before measurement represents a quantum bit (qubit). A sequence of one or more digits constitutes digital data that is used to represent a number or code for a character. In some embodiments, information called analog data is represented by a near continuum of measurable values within a particular range. Computer system 1000, or a portion thereof, constitutes a means for performing one or more steps of providing interaction between the playlists of a plurality of users.

A bus 1010 includes one or more parallel conductors of information so that information is transferred quickly among devices coupled to the bus 1010. One or more processors 1002 for processing information are coupled with the bus 1010.

A processor (or multiple processors) 1002 performs a set of operations on information as specified by computer program code related to providing interaction between the playlists of a plurality of users. The computer program code is a set of instructions or statements providing instructions for the operation of the processor and/or the computer system to perform specified functions. The code, for example, may be written in a computer programming language that is compiled into a native instruction set of the processor. The code may also be written directly using the native instruction set (e.g., machine language). The set of operations include bringing information in from the bus 1010 and placing information on the bus 1010. The set of operations also typically include comparing two or more units of information, shifting positions of units of information, and combining two or more units of information, such as by addition or multiplication or logical operations like OR, exclusive OR (XOR), and AND. Each operation of the set of operations that can be performed by the processor is represented to the processor by information called instructions, such as an operation code of one or more digits. A sequence of operations to be executed by the processor 1002, such as a sequence of operation codes, constitute processor instructions, also called computer system instructions or, simply, computer instructions. Processors may be implemented as mechanical, electrical, magnetic, optical, chemical, or quantum components, among others, alone or in combination.

Computer system 1000 also includes a memory 1004 coupled to bus 1010. The memory 1004, such as a random access memory (RAM) or any other dynamic storage device, stores information including processor instructions for providing interaction between the playlists of a plurality of users. Dynamic memory allows information stored therein to be changed by the computer system 1000. RAM allows a unit of information stored at a location called a memory address to be stored and retrieved independently of information at neighboring addresses. The memory 1004 is also used by the processor 1002 to store temporary values during execution of processor instructions. The computer system 1000 also includes a read only memory (ROM) 1006 or any other static storage device coupled to the bus 1010 for storing static information, including instructions, that is not changed by the computer system 1000. Some memory is composed of volatile storage that loses the information stored thereon when power is lost. Also coupled to bus 1010 is a non-volatile (persistent) storage device 1008, such as a magnetic disk, optical disk or flash card, for storing information, including instructions, that persists even when the computer system 1000 is turned off or otherwise loses power.

Information, including instructions for providing interaction between the playlists of a plurality of users, is provided to the bus 1010 for use by the processor from an external input device 1012, such as a keyboard containing alphanumeric keys operated by a human user, a microphone, an Infrared (IR) remote control, a joystick, a game pad, a stylus pen, a touch screen, or a sensor. A sensor detects conditions in its vicinity and transforms those detections into physical expression compatible with the measurable phenomenon used to represent information in computer system 1000. Other external devices coupled to bus 1010, used primarily for interacting with humans, include a display device 1014, such as a cathode ray tube (CRT), a liquid crystal display (LCD), a light emitting diode (LED) display, an organic LED (OLED) display, a plasma screen, or a printer for presenting text or images, and a pointing device 1016, such as a mouse, a trackball, cursor direction keys, or a motion sensor, for controlling a position of a small cursor image presented on the display 1014 and issuing commands associated with graphical elements presented on the display 1014, and one or more camera sensors 1094 for capturing, recording and causing to store one or more still and/or moving images (e.g., videos, movies, etc.) which also may comprise audio recordings. In some embodiments, for example, in embodiments in which the computer system 1000 performs all functions automatically without human input, one or more of external input device 1012, display device 1014 and pointing device 1016 may be omitted.

In the illustrated embodiment, special purpose hardware, such as an application specific integrated circuit (ASIC) 1020, is coupled to bus 1010. The special purpose hardware is configured to perform operations not performed by processor 1002 quickly enough for special purposes. Examples of ASICs include graphics accelerator cards for generating images for display 1014, cryptographic boards for encrypting and decrypting messages sent over a network, speech recognition, and interfaces to special external devices, such as robotic arms and medical scanning equipment that repeatedly perform some complex sequence of operations that are more efficiently implemented in hardware.

Computer system 1000 also includes one or more instances of a communications interface 1070 coupled to bus 1010. Communication interface 1070 provides a one-way or two-way communication coupling to a variety of external devices that operate with their own processors, such as printers, scanners and external disks. In general the coupling is with a network link 1078 that is connected to a local network 1080 to which a variety of external devices with their own processors are connected. For example, communication interface 1070 may be a parallel port or a serial port or a universal serial bus (USB) port on a personal computer. In some embodiments, communications interface 1070 is an integrated services digital network (ISDN) card or a digital subscriber line (DSL) card or a telephone modem that provides an information communication connection to a corresponding type of telephone line. In some embodiments, a communication interface 1070 is a cable modem that converts signals on bus 1010 into signals for a communication connection over a coaxial cable or into optical signals for a communication connection over a fiber optic cable. As another example, communications interface 1070 may be a local area network (LAN) card to provide a data communication connection to a compatible LAN, such as Ethernet. Wireless links may also be implemented. For wireless links, the communications interface 1070 sends or receives or both sends and receives electrical, acoustic or electromagnetic signals, including infrared and optical signals, that carry information streams, such as digital data. For example, in wireless handheld devices, such as mobile telephones like cell phones, the communications interface 1070 includes a radio band electromagnetic transmitter and receiver called a radio transceiver. In certain embodiments, the communications interface 1070 enables connection to the communication network for providing interaction between the playlists of a plurality of users to the UE.

The term "computer-readable medium" as used herein refers to any medium that participates in providing information to processor 1002, including instructions for execution. Such a medium may take many forms, including, but not limited to computer-readable storage medium (e.g., non-volatile media, volatile media), and transmission media. Non-transitory media, such as non-volatile media, include, for example, optical or magnetic disks, such as storage device 1008. Volatile media include, for example, dynamic memory 1004. Transmission media include, for example, twisted pair cables, coaxial cables, copper wire, fiber optic cables, and carrier waves that travel through space without wires or cables, such as acoustic waves and electromagnetic waves, including radio, optical and infrared waves. Signals include man-made transient variations in amplitude, frequency, phase, polarization or other physical properties transmitted through the transmission media. Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, an EPROM, a FLASH-EPROM, an EEPROM, a flash memory, any other memory chip or cartridge, a carrier wave, or any other medium from which a computer can read. The term computer-readable storage medium is used herein to refer to any computer-readable medium except transmission media.

Logic encoded in one or more tangible media includes one or both of processor instructions on a computer-readable storage media and special purpose hardware, such as ASIC 1020.

Network link 1078 typically provides information communication using transmission media through one or more networks to other devices that use or process the information. For example, network link 1078 may provide a connection through local network 1080 to a host computer 1082 or to equipment 1084 operated by an Internet Service Provider (ISP). ISP equipment 1084 in turn provides data communication services through the public, world-wide packet-switching communication network of networks now commonly referred to as the Internet 1090.

A computer called a server host 1092 connected to the Internet hosts a process that provides a service in response to information received over the Internet. For example, server host 1092 hosts a process that provides information representing video data for presentation at display 1014. It is contemplated that the components of system 1000 can be deployed in various configurations within other computer systems, e.g., host 1082 and server 1092.

At least some embodiments of the invention are related to the use of computer system 1000 for implementing some or all of the techniques described herein. According to one embodiment of the invention, those techniques are performed by computer system 1000 in response to processor 1002 executing one or more sequences of one or more processor instructions contained in memory 1004. Such instructions, also called computer instructions, software and program code, may be read into memory 1004 from another computer-readable medium such as storage device 1008 or network link 1078. Execution of the sequences of instructions contained in memory 1004 causes processor 1002 to perform one or more of the method steps described herein. In alternative embodiments, hardware, such as ASIC 1020, may be used in place of or in combination with software to implement the invention. Thus, embodiments of the invention are not limited to any specific combination of hardware and software, unless otherwise explicitly stated herein.

The signals transmitted over network link 1078 and other networks through communications interface 1070, carry information to and from computer system 1000. Computer system 1000 can send and receive information, including program code, through the networks 1080, 1090 among others, through network link 1078 and communications interface 1070. In an example using the Internet 1090, a server host 1092 transmits program code for a particular application, requested by a message sent from computer 1000, through Internet 1090, ISP equipment 1084, local network 1080 and communications interface 1070. The received code may be executed by processor 1002 as it is received, or may be stored in memory 1004 or in storage device 1008 or any other non-volatile storage for later execution, or both. In this manner, computer system 1000 may obtain application program code in the form of signals on a carrier wave.

Various forms of computer readable media may be involved in carrying one or more sequence of instructions or data or both to processor 1002 for execution. For example, instructions and data may initially be carried on a magnetic disk of a remote computer such as host 1082. The remote computer loads the instructions and data into its dynamic memory and sends the instructions and data over a telephone line using a modem. A modem local to the computer system 1000 receives the instructions and data on a telephone line and uses an infra-red transmitter to convert the instructions and data to a signal on an infra-red carrier wave serving as the network link 1078. An infrared detector serving as communications interface 1070 receives the instructions and data carried in the infrared signal and places information representing the instructions and data onto bus 1010. Bus 1010 carries the information to memory 1004 from which processor 1002 retrieves and executes the instructions using some of the data sent with the instructions. The instructions and data received in memory 1004 may optionally be stored on storage device 1008, either before or after execution by the processor 1002.

Figure 11:
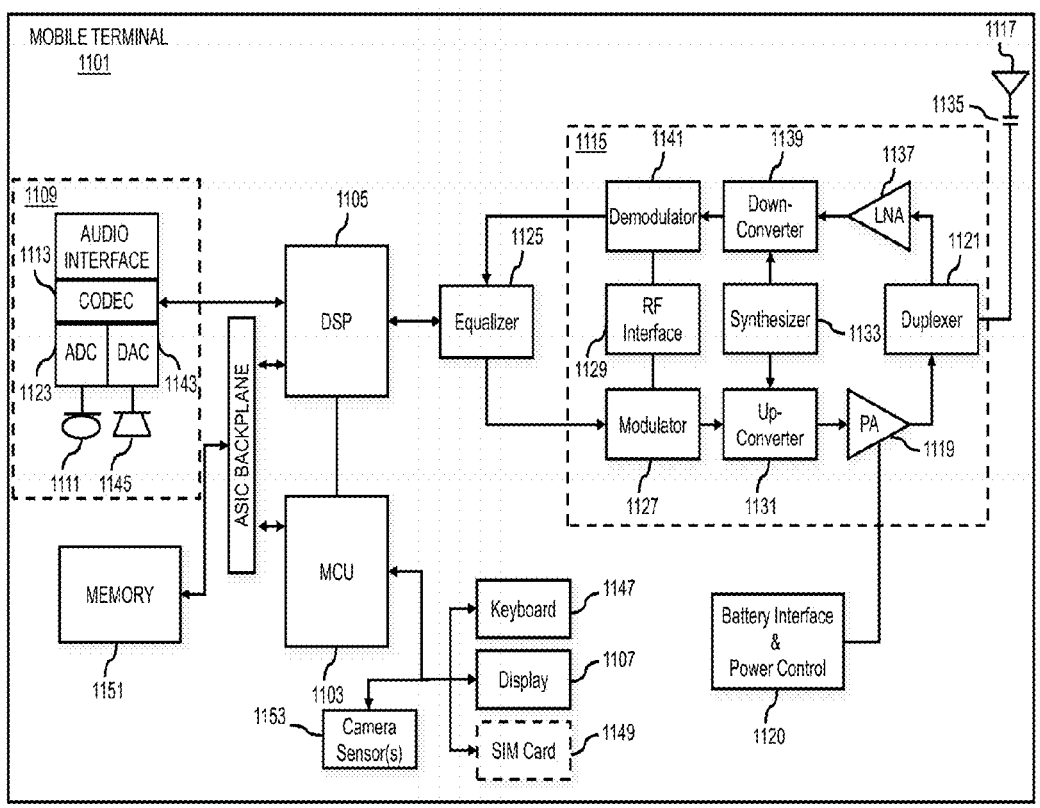
FIG. 11 illustrates a chip set or chip 1100 upon which an embodiment of the invention may be implemented.

FIG. 11 illustrates a chip set or chip 1100 upon which an embodiment of the invention may be implemented. Chip set 1100 is programmed to providing interaction between the playlists of a plurality of users as described herein and includes, for instance, the processor and memory components described with respect to FIG. 10 incorporated in one or more physical packages (e.g., chips). By way of example, a physical package includes an arrangement of one or more materials, components, and/or wires on a structural assembly (e.g., a baseboard) to provide one or more characteristics such as physical strength, conservation of size, and/or limitation of electrical interaction. It is contemplated that in certain embodiments the chip set 1100 can be implemented in a single chip. It is further contemplated that in certain embodiments the chip set or chip 1100 can be implemented as a single "system on a chip." It is further contemplated that in certain embodiments a separate ASIC would not be used, for example, and that all relevant functions as disclosed herein would be performed by a processor or processors. Chip set or chip 1100, or a portion thereof, constitutes a means for performing one or more steps of providing user interface navigation information associated with the availability of functions. Chip set or chip 1100, or a portion thereof, constitutes a means for performing one or more steps of providing interaction between the playlists of a plurality of users.

In one embodiment, the chip set or chip 1100 includes a communication mechanism such as a bus 1101 for passing information among the components of the chip set 1100. A processor 1103 has connectivity to the bus 1101 to execute instructions and process information stored in, for example, a memory 1105. The processor 1103 may include one or more processing cores with each core configured to perform independently. A multi-core processor enables multiprocessing within a single physical package. Examples of a multi-core processor include two, four, eight, or greater numbers of processing cores. Alternatively or in addition, the processor 1103 may include one or more microprocessors configured in tandem via the bus 1101 to enable independent execution of instructions, pipelining, and multithreading. The processor 1103 may also be accompanied with one or more specialized components to perform certain processing functions and tasks such as one or more digital signal processors (DSP) 1107, or one or more application-specific integrated circuits (ASIC) 1109. A DSP 1107 typically is configured to process real-world signals (e.g., sound) in real time independently of the processor 1103. Similarly, an ASIC 1109 can be configured to performed specialized functions not easily performed by a more general purpose processor. Other specialized components to aid in performing the inventive functions described herein may include one or more field programmable gate arrays (FPGA), one or more controllers, or one or more other special-purpose computer chips.

In one embodiment, the chip set or chip 1100 includes merely one or more processors and some software and/or firmware supporting and/or relating to and/or for the one or more processors.

The processor 1103 and accompanying components have connectivity to the memory 1105 via the bus 1101. The memory 1105 includes both dynamic memory (e.g., RAM, magnetic disk, writable optical disk, etc.) and static memory (e.g., ROM, CD-ROM, etc.) for storing executable instructions that when executed perform the inventive steps described herein to providing interaction between the playlists of a plurality of users. The memory 1105 also stores the data associated with or generated by the execution of the inventive steps.

Figure 12:
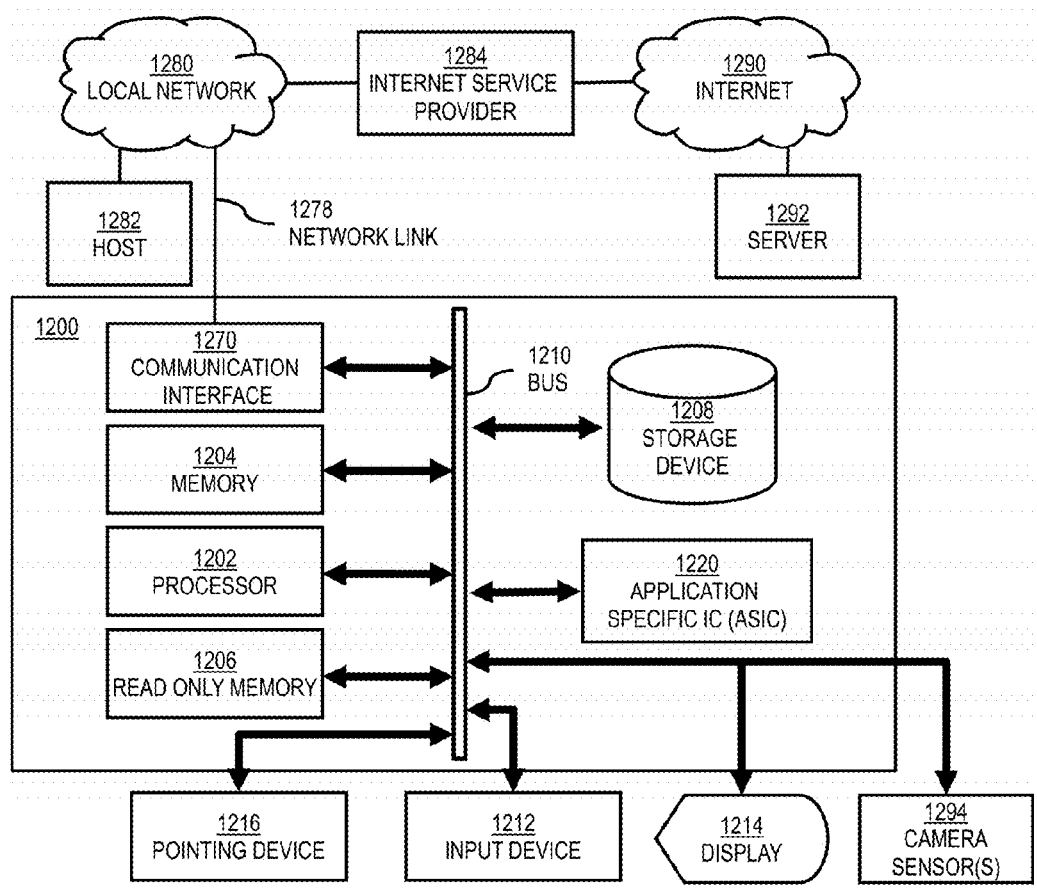
FIG. 12 is a diagram of exemplary components of a mobile terminal (e.g., handset) for communications, which is capable of operating in the system of FIG. 1, according to one embodiment.

FIG. 12 is a diagram of exemplary components of a mobile terminal (e.g., handset) for communications, which is capable of operating in the system of FIG. 1, according to one embodiment. In some embodiments, mobile terminal 1201, or a portion thereof, constitutes a means for performing one or more steps of providing interaction between the playlists of a plurality of users. Generally, a radio receiver is often defined in terms of front-end and back-end characteristics. The front-end of the receiver encompasses all of the Radio Frequency (RF) circuitry whereas the back-end encompasses all of the base-band processing circuitry. As used in this application, the term "circuitry" refers to both: (1) hardware-only implementations (such as implementations in only analog and/or digital circuitry), and (2) to combinations of circuitry and software (and/or firmware) (such as, if applicable to the particular context, to a combination of processor(s), including digital signal processor(s), software, and memory(ies) that work together to cause an apparatus, such as a mobile phone or server, to perform various functions). This definition of "circuitry" applies to all uses of this term in this application, including in any claims. As a further example, as used in this application and if applicable to the particular context, the term "circuitry" would also cover an implementation of merely a processor (or multiple processors) and its (or their) accompanying software/or firmware. The term "circuitry" would also cover if applicable to the particular context, for example, a baseband integrated circuit or applications processor integrated circuit in a mobile phone or a similar integrated circuit in a cellular network device or other network devices.

Pertinent internal components of the telephone include a Main Control Unit (MCU) 1203, a Digital Signal Processor (DSP) 1205, and a receiver/transmitter unit including a microphone gain control unit and a speaker gain control unit. A main display unit 1207 provides a display to the user in support of various applications and mobile terminal functions that perform or support the steps of providing interaction between the playlists of a plurality of users. The display 1207 includes display circuitry configured to display at least a portion of a user interface of the mobile terminal (e.g., mobile telephone). Additionally, the display 1207 and display circuitry are configured to facilitate user control of at least some functions of the mobile terminal. An audio function circuitry 1209 includes a microphone 1211 and microphone amplifier that amplifies the speech signal output from the microphone 1211. The amplified speech signal output from the microphone 1211 is fed to a coder/decoder (CODEC) 1213.

A radio section 1215 amplifies power and converts frequency in order to communicate with a base station, which is included in a mobile communication system, via antenna 1217. The power amplifier (PA) 1219 and the transmitter/modulation circuitry are operationally responsive to the MCU 1203, with an output from the PA 1219 coupled to the duplexer 1221 or circulator or antenna switch, as known in the art. The PA 1219 also couples to a battery interface and power control unit 1220.

In use, a user of mobile terminal 1201 speaks into the microphone 1211 and his or her voice along with any detected background noise is converted into an analog voltage. The analog voltage is then converted into a digital signal through the Analog to Digital Converter (ADC) 1223. The control unit 1203 routes the digital signal into the DSP 1205 for processing therein, such as speech encoding, channel encoding, encrypting, and interleaving. In one embodiment, the processed voice signals are encoded, by units not separately shown, using a cellular transmission protocol such as enhanced data rates for global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., microwave access (WiMAX), Long Term Evolution (LTE) networks, code division multiple access (CDMA), wideband code division multiple access (WCDMA), wireless fidelity (WiFi), satellite, and the like, or any combination thereof.

The encoded signals are then routed to an equalizer 1225 for compensation of any frequency-dependent impairments that occur during transmission though the air such as phase and amplitude distortion. After equalizing the bit stream, the modulator 1227 combines the signal with a RF signal generated in the RF interface 1229. The modulator 1227 generates a sine wave by way of frequency or phase modulation. In order to prepare the signal for transmission, an up-converter 1231 combines the sine wave output from the modulator 1227 with another sine wave generated by a synthesizer 1233 to achieve the desired frequency of transmission. The signal is then sent through a PA 1219 to increase the signal to an appropriate power level. In practical systems, the PA 1219 acts as a variable gain amplifier whose gain is controlled by the DSP 1205 from information received from a network base station. The signal is then filtered within the duplexer 1221 and optionally sent to an antenna coupler 1235 to match impedances to provide maximum power transfer. Finally, the signal is transmitted via antenna 1217 to a local base station. An automatic gain control (AGC) can be supplied to control the gain of the final stages of the receiver. The signals may be forwarded from there to a remote telephone which may be another cellular telephone, any other mobile phone or a land-line connected to a Public Switched Telephone Network (PSTN), or other telephony networks.

Voice signals transmitted to the mobile terminal 1201 are received via antenna 1217 and immediately amplified by a low noise amplifier (LNA) 1237. A down-converter 1239 lowers the carrier frequency while the demodulator 1241 strips away the RF leaving only a digital bit stream. The signal then goes through the equalizer 1225 and is processed by the DSP 1205. A Digital to Analog Converter (DAC) 1243 converts the signal and the resulting output is transmitted to the user through the speaker 1245, all under control of a Main Control Unit (MCU) 1203 which can be implemented as a Central Processing Unit (CPU).

The MCU 1203 receives various signals including input signals from the keyboard 1247. The keyboard 1247 and/or the MCU 1203 in combination with other user input components (e.g., the microphone 1211) comprise a user interface circuitry for managing user input. The MCU 1203 runs a user interface software to facilitate user control of at least some functions of the mobile terminal 1201 to providing interaction between the playlists of a plurality of users. The MCU 1203 also delivers a display command and a switch command to the display 1207 and to the speech output switching controller, respectively. Further, the MCU 1203 exchanges information with the DSP 1205 and can access an optionally incorporated SIM card 1249 and a memory 1251. In addition, the MCU 1203 executes various control functions required of the terminal. The DSP 1205 may, depending upon the implementation, perform any of a variety of conventional digital processing functions on the voice signals. Additionally, DSP 1205 determines the background noise level of the local environment from the signals detected by microphone 1211 and sets the gain of microphone 1211 to a level selected to compensate for the natural tendency of the user of the mobile terminal 1201.

The CODEC 1213 includes the ADC 1223 and DAC 1243. The memory 1251 stores various data including call incoming tone data and is capable of storing other data including music data received via, e.g., the global Internet. The software module could reside in RAM memory, flash memory, registers, or any other form of writable storage medium known in the art. The memory device 1251 may be, but not limited to, a single memory, CD, DVD, ROM, RAM, EEPROM, optical storage, magnetic disk storage, flash memory storage, or any other non-volatile storage medium capable of storing digital data.

An optionally incorporated SIM card 1249 carries, for instance, important information, such as the cellular phone number, the carrier supplying service, subscription details, and security information. The SIM card 1249 serves primarily to identify the mobile terminal 1201 on a radio network. The card 1249 also contains a memory for storing a personal telephone number registry, text messages, and user specific mobile terminal settings.

Further, one or more camera sensors 1253 may be incorporated onto the mobile station 1201 wherein the one or more camera sensors may be placed at one or more locations on the mobile station. Generally, the camera sensors may be utilized to capture, record, and cause to store one or more still and/or moving images (e.g., videos, movies, etc.) which also may comprise audio recordings.

While the invention has been described in connection with a number of embodiments and implementations, the invention is not so limited but covers various obvious modifications and equivalent arrangements, which fall within the purview of the appended claims. Although features of the invention are expressed in certain combinations among the claims, it is contemplated that these features can be arranged in any combination and order.

What is claimed is:

1. A computer implemented method comprising:
   determining at least two associated users who are presented media items based on respective playlists of media items,
   analyzing, by a processor, media items in the respective playlists to determine similarity information for the media items in the respective playlists,
   causing insertion of at least one further media item in the respective playlists of each of the at least two users at least in part based on the determined similarity information,
   determining at least one first set of media items in the respective lists, wherein media items in a first set end approximately at the same time,
   determining candidate sets of media items for individual media items of the first sets, wherein the media items of each candidate set are selected based on similarity with an individual media item of the respective first set,
   determining whether there is at least one first set of media items where the associated candidate sets contain at least one same further media item, and
   selecting said same further media item for insertion in each playlist.

2. A method according to claim 1, comprising determining suitable locations in the respective playlists for the insertion of the at least one further media item.

3. A method according to claim 1, comprising causing the insertion in the respective playlists such that the at least one further media item is timed to be presented substantially at the same time for the at least two associated users.

4. A method according to claim 1, comprising inserting the selected further media item in the playlists in a location after the media items in the determined first set of media items.

5. A method according to claim 1, comprising enabling communications between devices of the at least two users when the at least one item is presented from the respective playlists.

6. A method according to claim 1, comprising communication of additional information associated with at least one of the users in association with presentation of the at least one further media item, the additional information comprising at least one of location of the user, current activity of the user, audio and/or visual presentation captured by a device of the user, recommendation of another media item relating to the at least one further media item, and posting in a social media network.

7. A method according to claim 1, comprising inserting at least one transitional media item in at least one of the playlists.

8. A method according to claim 1, wherein the at least one further media item is selected by an apparatus of a media item delivery system or a social networking system, based on at least one media item in at least one playlist and/or based on recommendation by a user.

9. A method according to claim 1, comprising receiving instructions from a user about the timing and/or at least one other user regarding at least one further media item to be inserted.

10. A method according to claim 1, wherein the media items comprise tracks of music, images, video presentation, multimedia presentations, electronic books, electronic cartoons, or electronic articles.

11. An apparatus comprising at least one processor, and at least one memory including computer program code, wherein the at least one memory and the computer program code are configured, with the at least one processor, to:
    determine at least two associated users who are presented media items based on respective playlists of media items,
    analyze media items in the respective playlists to determine similarity information for the media items in the respective playlists, and
    cause insertion of at least one further media item in the respective playlists of each of the at least two users at least in part based on the determined similarity information,
    determine first sets of media items in the respective lists, wherein media items in a first set end approximately at the same time,
    determine candidate sets of media items for individual media items of the first sets, wherein the media items of each candidate set are selected based on similarity with an individual media item of the respective first set,
    determine whether there is at least one first set of media items where the associated candidate sets contain at least one same further media item, and
    select said same further media item for insertion in each playlist.

12. An apparatus according to claim 11, configured to determine suitable locations in the respective playlists for the insertion of the at least one further media item.

13. An apparatus according to claim 11, configured to cause the insertion in the respective playlists such that the at least one further media item is timed to be presented substantially at the same time for the at least two associated users.

14. An apparatus according to claim 11, configured to enable communications to and/or from at least one user device in association with the insertion of the at least one further media item.

15. An apparatus according to claim 11, configured to enable communication of additional information associated with at least one of the users in association with presentation of the at least one further media item, the additional information comprising at least one of location of the user, current activity of the user, audio and/or visual presentation captured by a device of the user, recommendation of another media item relating to the at least one further media item, and posting in a social media network.

16. An apparatus according to claim 11, configured to cause insertion of at least one transitional media item in at least one of the playlists.

17. A non-transitory computer-readable medium carrying code which, when executed by one or more processors, cause an apparatus to perform:
    determining at least two associated users who are presented media items based on respective playlists of media items,
    analyzing media items in the respective playlists to determine similarity information for the media items in the respective playlists,
    causing insertion of at least one further media item in the respective playlists of each of the at least two users at least in part based on the determined similarity information, determining at least one first set of media items in the respective lists, wherein media items in a first set end approximately at the same time, determining candidate sets of media items for individual media items of the first sets, wherein the media items of each candidate set are selected based on similarity with an individual media item of the respective first set, determining whether there is at least one first set of media items where the associated candidate sets contain at least one same further media item, and selecting said same further media item for insertion in each playlist.

18. A non-transitory computer-readable medium according to claim 17, wherein the apparatus is further caused to perform determining suitable locations in the respective playlists for the insertion of the at least one further media item.

19. A non-transitory computer-readable medium according to claim 17, wherein the apparatus is further caused to perform causing the insertion in the respective playlists such that the at least one further media item is timed to be presented substantially at the same time for the at least two associated users.

20. A non-transitory computer-readable medium according to claim 17, comprising inserting the selected further media item in the playlists in a location after the media items in the determined first set of media items.

21. A non-transitory computer-readable medium according to claim 17, comprising enabling communications between devices of the at least two users when the at least one item is presented from the respective playlists.

* * * * *